United States Patent
Chen et al.

(10) Patent No.: US 9,215,355 B2
(45) Date of Patent: Dec. 15, 2015

(54) SCENE ADAPTIVE TEMPORAL FILTERING

(75) Inventors: Ting Chen, Sunnyvale, CA (US);
Yongfang Liang, San Jose, CA (US);
Anita Nariani Schulze, Los Altos, CA (US)

(73) Assignee: Apple Inc., Cupertino, CA (US)

(*) Notice: Subject to any disclaimer, the term of this patent is extended or adjusted under 35 U.S.C. 154(b) by 359 days.

(21) Appl. No.: 13/619,592

(22) Filed: Sep. 14, 2012

(65) Prior Publication Data

US 2013/0083246 A1  Apr. 4, 2013

Related U.S. Application Data

(60) Provisional application No. 61/541,734, filed on Sep. 30, 2011.

(51) Int. Cl.
| | |
|---|---|
| *H04N 5/217* | (2011.01) |
| *H04N 5/14* | (2006.01) |
| *H04N 5/213* | (2006.01) |
| *G06T 5/00* | (2006.01) |
| *H04N 5/357* | (2011.01) |

(52) U.S. Cl.
CPC ............... *H04N 5/217* (2013.01); *G06T 5/002* (2013.01); *H04N 5/145* (2013.01); *H04N 5/213* (2013.01); *G06T 2207/20182* (2013.01); *G06T 2207/20201* (2013.01); *H04N 5/357* (2013.01)

(58) Field of Classification Search
CPC ..................... G06T 5/002; G06T 2207/20182; G06T 2207/20201; G06T 5/40; G06T 2207/10016; G06T 2207/20224; H04N 5/213; H04N 5/145; H04N 5/217; H04N 5/357; H04N 5/144; H04N 5/208; H04N 5/21; H04N 5/147; H04N 9/646; G06K 9/40
USPC ................ 348/241–253, 273, 470, 606–625, 348/630–631

See application file for complete search history.

(56) References Cited

U.S. PATENT DOCUMENTS

| | | | |
|---|---|---|---|
| 7,369,181 B2 | 5/2008 | Kang et al. | |
| 7,515,638 B2* | 4/2009 | Le Meur | H04N 19/105 375/240.12 |
| 7,660,439 B1* | 2/2010 | Lu | G06K 9/00711 348/699 |
| 8,704,945 B1* | 4/2014 | Xin | H04N 7/012 348/452 |
| 2007/0025442 A1* | 2/2007 | Okada | H04N 19/52 375/240.03 |
| 2007/0211175 A1* | 9/2007 | Lee | H04N 9/77 348/607 |
| 2008/0273119 A1* | 11/2008 | Yang | G06T 5/002 348/575 |
| 2010/0091194 A1 | 4/2010 | Lei et al. | |
| 2010/0165207 A1* | 7/2010 | Deng | H04N 5/213 348/620 |
| 2010/0201883 A1* | 8/2010 | Delva | G06T 5/50 348/607 |

(Continued)

*Primary Examiner* — Pritham Prabhakher
(74) *Attorney, Agent, or Firm* — Kenyon & Kenyon LLP

(57) ABSTRACT

Calculating a temporal filter values to filter video data for noise and ghosting artifacts. A sensor specific noise model may be derived using the video capture settings of the video source to estimate the noise variance for an image, and to determine the amount of the temporal filtering to be applied to a frame or pixel. The global motion and sensor specific noise model may be used to populate filter coefficient look-up tables based on the local motion and luma values of each pixel in the frame. The maximum absolute difference between frames may be used to estimate global motion between two frames such that filter strength may be reduced for frames exhibiting high global motion and increased for frames exhibiting low global motion. According to an embodiment, the increase in temporal filtering between frames may be capped to avoid sudden visible noise differences between frames.

34 Claims, 7 Drawing Sheets

(56) References Cited

U.S. PATENT DOCUMENTS

| | | | |
|---|---|---|---|
| 2010/0310190 A1 | 12/2010 | Lin | |
| 2011/0019094 A1* | 1/2011 | Rossignol | G06K 9/40 348/607 |
| 2012/0019727 A1* | 1/2012 | Zhai | H04N 5/213 348/607 |
| 2012/0019728 A1 | 1/2012 | Moore | |
| 2012/0062797 A1* | 3/2012 | Segall | H04N 5/208 348/606 |
| 2012/0076429 A1* | 3/2012 | Segall | H04N 19/86 382/232 |

\* cited by examiner

100

200

400

600

700

SCENE ADAPTIVE TEMPORAL FILTERING

CROSS-REFERENCE TO RELATED APPLICATION

The present application claims the benefit of U.S. provisional application Ser. No. 61/541,734, filed Sep. 30, 2011, entitled, "SCENE ADAPTIVE TEMPORAL FILTERING", the disclosure of which is incorporated herein by reference in its entirety.

BACKGROUND

Aspects of the present invention relate generally to the field of image processing, and more specifically to noise reduction.

In image processing systems, video or image data may be captured by a camera having a sensor. Conventional cameras convert the captured analog information from the sensor to digital data that is passed to an ISP for signal processing. The processed signal is then passed to a CPU or GPU for additional processing including filtering, encoding, image recognition, pattern or shape recognition, color enhancement, sharpening, or other image enhancing processes.

As well as capturing the desired image, the sensor may capture some background noise in the analog signal. The signal-to-noise ratio (SNR) for a captured signal reflects a comparison of the desired signal to the noise in the signal. As noise in a signal may cause distortion and visible artifacts in the captured image, SNR is also a reflection of the quality of the captured signal. The SNR of a captured image may vary based on the lighting available when capturing the image. In bright conditions with a lot of light, the SNR may be high. However, with dim or low lighting conditions, the captured image may have more noise and therefore a smaller SNR.

Conventional image processing systems use a CPU or GPU to filter the processed images to improve the quality of the signal and prepare the processed image for display by reducing noise and improving SNR. The CPU or GPU may implement a spatial or temporal filter for noise reduction. Spatial filters reduce or filter noise in a single captured frame by averaging the signals representing the captured frame to cut off outlying signals that likely represent noise. Spatial filters are conventionally implemented with a low pass filter. Temporal filters reduce or filter noise across multiple frames representing images captured over time. Then, for frames depicting the same scene, the difference between the frames may represent noise. The temporal filter identifies these differences and reduces the identified noise throughout the sequence of frames. Then the SNR will improve over time as the spatial filter uses the scene history to improve filtering operations.

However, temporal filtering may result in ghosting. Ghosting occurs when part of a first image appears in a second, later image. Strong temporal filtering, where the filtering relies in large part on the history of a sequence of images, may cause certain areas of a later image to be inappropriately filtered, resulting in noticeable ghosting and artifacts. This is particularly common when an object in a first image has moved in the second image or a change in lighting conditions results in an improved SNR. A noticeable artifact in an image may be the result of strong temporal based filtering causing ghosting, may be the result of motion blur, or may just be distortion caused by noise.

Accordingly, there is a need in the art to adapt to changing lighting and image conditions while optimizing the filtering operations to limit visible noise in the image.

BRIEF DESCRIPTION OF THE DRAWINGS

The foregoing and other aspects of various embodiments of the present invention will be apparent through examination of the following detailed description thereof, in conjunction with the accompanying drawing figures in which similar reference numbers are used to indicate functionally similar elements.

DETAILED DESCRIPTION

Auto exposure adjustment of a camera or other analog image sensor is usually achieved using a fixed algorithm. According to an embodiment, a sensor specific noise model may be derived using the read noise, well capacity, and conversion gain of the adjustment algorithm. The noise model may then be used to estimate the noise variance for an image, and to determine the amount of the temporal filtering to be applied to a frame or pixel.

The maximum absolute difference between frames may be used to estimate global motion between two frames. When the estimated motion is over a threshold, the filter strength may be reduced significantly, and motion history may be disabled to further reduce any ghosting artifacts. Significant auto-exposure changes or darker areas of the scenes may be used to modulate the strength of temporal filtering to further help reduce ghosting artifacts. In addition, the increase in temporal filtering between frames may be capped to avoid sudden visible noise differences between frames.

The global motion and sensor noise model may be used to populate a motion based lookup table that may be utilized for an entire frame. Then, each pixel of the frame may be filtered using filter coefficients calculated based on the global motion, the motion history for a collocated previous pixel, and a local motion between the previous and current pixel.

To have an effective motion estimate across light levels, without oscillation in the amount of temporal noise filtering, a state machine may be implemented to dynamically configure a motion threshold. The state machine helps stabilize the filtering strength, especially in low light when noise dominates and can be incorrectly interpreted as motion.

Figure 1:
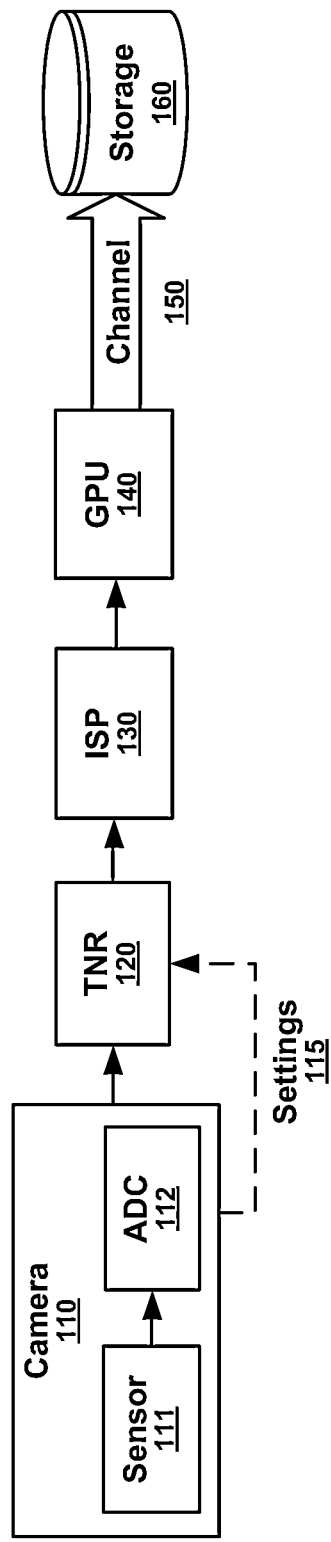
FIG. 1 is a simplified block diagram of an exemplary image processing system that processes image data according to an embodiment of the present invention.

FIG. 1 is a simplified block diagram of an exemplary image processing system 100 that receives and processes source image data from a sensor according to an embodiment of the present invention. As shown in FIG. 1, image processing system 100 may include a camera 110 that captures image or video data, a temporal noise reduction (TNR) unit 120 that includes a filter for filtering the raw, unprocessed signal from the camera, an image signal processor (ISP) 130 to process the digital image, a CPU and/or GPU 140 to perform additional image processing to the digital image, and a channel 150 that may deliver the coded image data output from the image processing system to a receiving unit, to a display, or to storage 160. The channel 150 may be a transmission channel provided by communications or computer networks, for example, either a wired or wireless network.

The camera 110 may further include an image sensor 111 to capture an optical image as an analog signal and an analog-to-digital converter (ADC) 112 to convert the analog signal from the sensor 111 into a digital signal. The sensor may interpret an image as an analog signal. According to an embodiment, the sensor 111 and ADC 112 may be implemented together as part of the camera 110 as a single application specific integrated circuit (ASIC).

The digital signal may then be passed to the TNR 120, or intercepted by the TNR 120. The signal may consist of a sequence of video frames, each frame depicting a still image of the captured scene. After the TNR filters the frames, the signal may be transmitted to the signal processor 130 for additional processing and preparation for storage or display, for example, the filtered signal may be encoded for data compression using a predictive coding technique.

The TNR 120 may be implemented to adapt to the camera sensor 111. Sensor based filtering may utilize a noise model developed for the connected sensor 111 to optimize temporal noise filtering. According to an embodiment, the TNR 120 may be implemented independently or as part of a system-on-a-chip (SOC) with one or more of the other elements of the system 100. The TNR unit 120 may separately control the amount of filtering for each received image, each block of the received image, or each pixel of the received image. Generally, as temporal filtering may cause noticeable ghosting for objects in motion, the filter strength may decrease as motion increases. Information received from the sensor 111 that is used to adjust the TNR filter may include current exposure settings for the captured image including, for example, the exposure time and the analog or digital gain. The exposure setting information may be received from the camera 110 with the captured image or as a separate transmission 115, or may be received directly from a controller.

The ISP 130 may be a specialized processor designed to efficiently process the digital signal including segmenting, interpolation, interlacing, or encoding. The ISP 130 may be implemented as a single application specific integrated circuit (ASIC) or as part of an SOC.

The GPU 140 may be a specialized circuit designed to process image data and prepare video for display. The GPU 140 may perform operations on the digital signal including filtering, image recognition, pattern or shape recognition, color enhancement, sharpening, edge detection, buffering, or other image enhancing processes. The GPU 140 may be implemented as a single SOC or on the same SOC as the ISP 130 and/or TNR 120.

Figure 2:
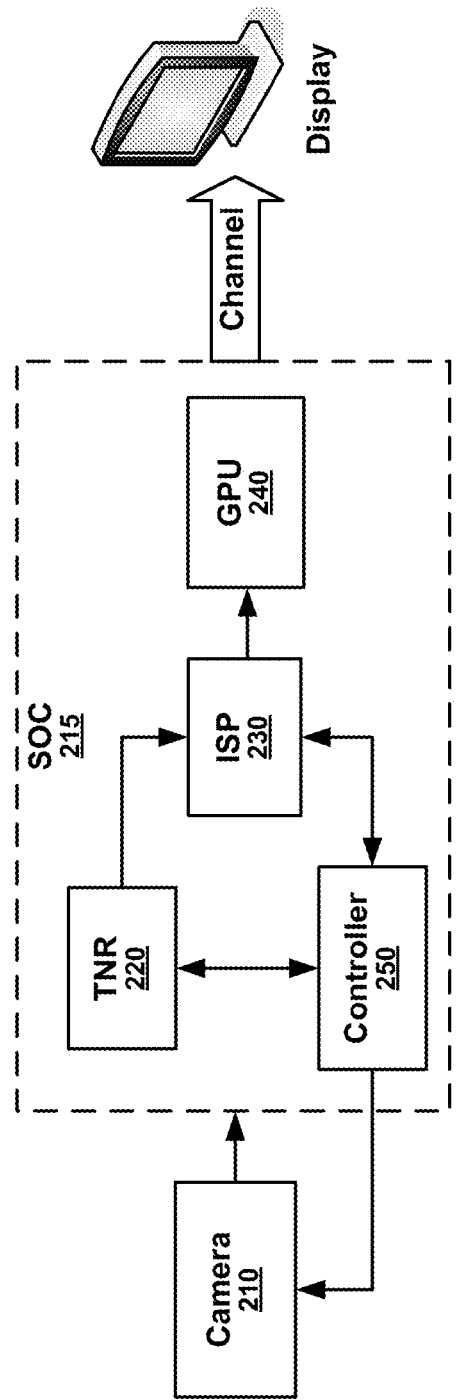
FIG. 2 is a simplified block diagram of an exemplary image processing system that processes image data according to an embodiment of the present invention.

FIG. 2 is a simplified block diagram of an exemplary image processing system 200 that receives and processes source image data from a sensor according to an embodiment of the present invention. As shown in FIG. 2, image processing system 200 may include a camera 210 that captures image or video data, an SOC 215 including a temporal noise reduction (TNR) unit 220, an image signal processor (ISP) 230, a GPU 240, and a controller 250 to control the exposure settings in the camera 210. Information received from the camera 210 used to adjust the TNR filter, including current camera 210 exposure settings, may be received directly from the controller 250. The controller 250 may be part of an optional SOC 215 implemented with one or more elements of the system 200, as part of a camera 210 ASIC, or as a separate independent component. As previously noted, the TNR 220, ISP 230, and GPU 240 may be implemented as part of an optional SOC 215 with one or more of the other elements of the system 200.

Figure 3:
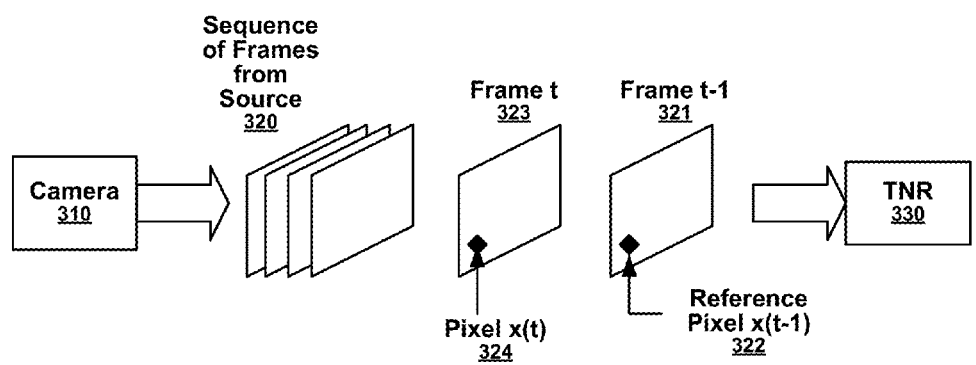
FIG. 3 illustrates an exemplary sequence of frames received from a data source to be processed by an image processing system according to an embodiment of the present invention.

FIG. 3 illustrates an exemplary sequence of frames 320 received from a data source 310 to be processed by an image processing system according to an embodiment of the present invention. As shown in FIG. 3, a sequence of frames 320 may be output from a data source 310 and received at a temporal noise reduction unit (TNR) 330. According to an embodiment, to process a frame 323, global motion between current frame 323 and previously processed frame 321 may be calculated. Then for each pixel x(t) 324 in the frame 323, the local motion between the pixel x(t) 324 and the collocated reference pixel x(t−1) 322 of the previously processed frame 321 may be calculated. According to an embodiment, motion value for pixel x(t) may be calculated as the maximum of three horizontal collated differences in line with x(t). The value of the local motion may be calculated by the TNR or may be received at the TNR by a hardware unit for calculating local motion. Using the calculated motion values, the TNR 330 may determine filter coefficients and then filter the pixel x(t).

Figure 4:
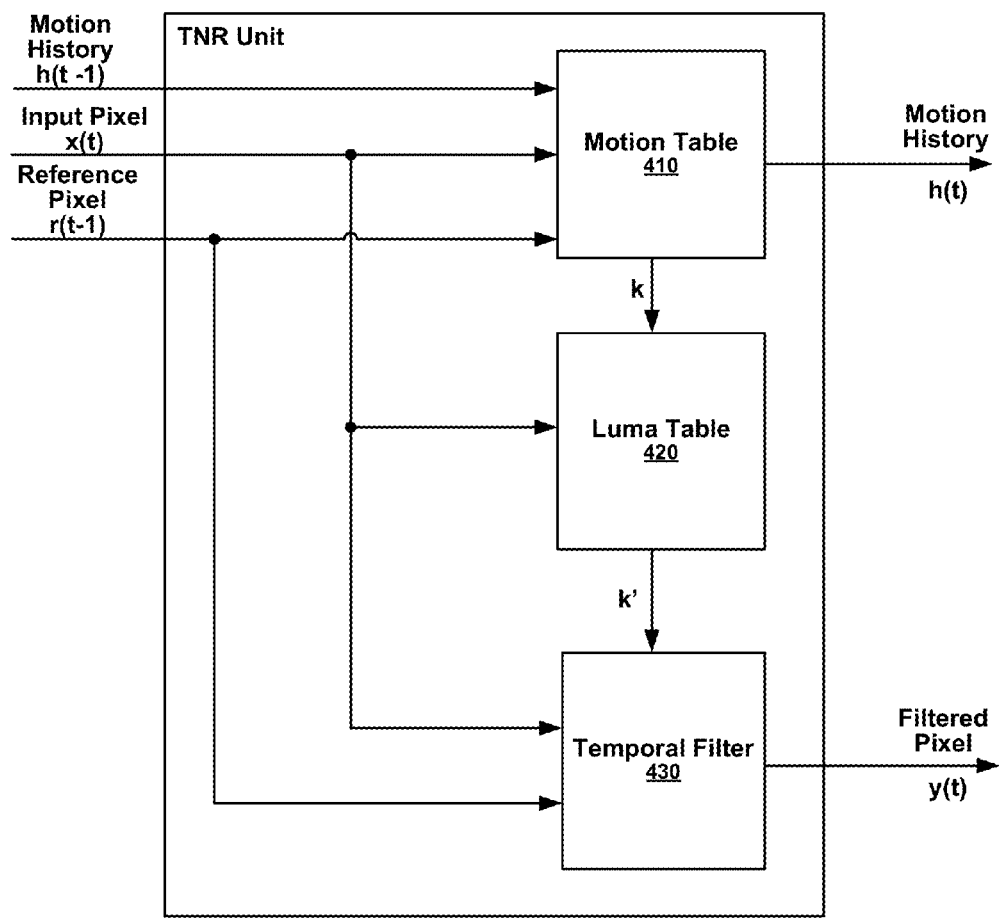
FIG. 4 is a simplified block diagram of a temporal noise reduction unit (TNR) according to an embodiment of the present invention.

FIG. 4 is a simplified block diagram of a temporal noise reduction unit (TNR) 400 according to an embodiment of the present invention. The TNR may receive or intercept the digital source signal from the camera and process each video frame. As shown in FIG. 4, temporal noise reduction unit 400 may include a motion table 410 that identifies filter coefficients based on local motion values, a luma table 420 that identifies a luma attenuation factor for filter coefficients based on the pixel luminance values, and a temporal filter 430 to filter the current pixel x(t).

The motion table 410 may include lookup values for a range of filter strengths to be used for various motion values. A single motion table may be referenced for an entire frame. The luma table 420 may be populated with values representing adjustments to the filter strength based on the various luminance values for each of the pixels in the frame. The luma table 420 may be referenced for an entire frame. The temporal filter 430 may use a filter strength calculated from the lookup values retrieved from the motion table 410 and luma table 420 for each pixel; the lookup based on the local motion, a reference pixel, the motion history of the pixel, and a noise model for the sensor to filter the raw digital value for each pixel. The temporal filter 430 may be a two-tap filter using the motion table 410 filter coefficient and the motion table 410 filter coefficient adjusted by the luma attenuation factor as the filter coefficients.

The TNR 400 may determine an appropriate filter strength for each pixel of an image frame received at time t, in part using information from a previous frame, received at time t−1. As shown, y(t) is the filtered output pixel and is determined from the filter strength (k') applied at the current pixel. The TNR 400 may receive as inputs a reference pixel r(t−1), the current pixel x(t), and a weight given to the history of the previous pixel h(t−1). The reference pixel r(t−1) may be either the output of the TNR 400 for the collocated pixel of the previous frame y(t−1) or the original collocated pixel of the previous frame x(t−1).

The weight given to the pixel history h(t−1) and accordingly the effect the pixel history has on the filter for the current pixel x(t) may vary. For example, with low or zero effective motion, the history or difference between temporally consecutive pixels, may take precedence in determining filtering and the history may have a greater weight. In a low motion pixel, the difference between two consecutive frames may be considered mostly noise and filter strength may depend greatly on the magnitude of the difference representing estimated noise. With a higher motion, the difference between consecutive pixels cannot be assumed to be noise, then the current frame may be the predominant factor in determining filtering and the weight assigned to the history may be lower. h(t) is the weight given to the history of the pixel and may be calculated as a function of local motion d(t) and the determined filter coefficient k for the current pixel applied to a combination of the motion history h(t−1) and the local motion delta d(t−1) for the previous pixel. For example, according to an embodiment, h(t) may be determined according to Equation 1(a):

$$h(t)=d(t)+k*(h(t-1)-d(t)) \qquad \text{EQ. 1(a)}$$

According to an alternate embodiment, h(t) may be calculated according to Equation 1(b):

$$h(t)=d(t)+k*h(t-1) \qquad \text{EQ. 1(B)}$$

The first determined filter coefficient (k) may be determined as the lookup value M in the motion table 410 for a value calculated from the current pixel x(t), the reference pixel r(t−1), and the motion history of the previous pixel h(t−1). For example, according to an embodiment, the lookup value may be calculated according to Equation 2:

$$M=|x(t)-r(t-1)|+h(t-1) \qquad \text{EQ. 2}$$

If the filter strength k=1, the weight of the motion history may be effectively 100% as no part of the current pixel would pass through the filter and the value for the previous pixel would be shown. If the filter strength k=0, the history may be afforded no weight such that the value of the current pixel would not be filtered and would be equal to the current pixel value as determined at the sensor. The second determined filter coefficient (k') may then be determined by adjusting the first determined filter coefficient (k) by the luma attenuation factor identified from the lookup L in the luma table 420 for the current pixel x(t). For example, according to an embodiment, k' may be calculated according to Equation 3:

$$k'=k*L[x(t)] \qquad \text{EQ. 3}$$

If a frame has high motion, for example if the detected motion is over a predefined threshold) the history of the pixels in the frame may become less important, the temporal filtering may be reduced quickly, and the filter strength calculated by the TNR 400 may rapidly drop. The motion threshold may be controlled by a state machine to avoid oscillations between high and low filter strengths across light levels. A state machine may help stabilize the filter strength when noise dominates in low light and can be incorrectly interpreted as motion. Then in a frame with low motion, the motion threshold for each pixel may be higher. The motion threshold may additionally be determined with reference to changes in the auto exposure settings or the filtering requirements for darker areas of the frame. According to an embodiment, the history may be disabled so that the motion considerations are the primary factor in determining filter strength.

According to an embodiment, if a scene is relatively static and has low motion, the temporal filter strength may be gradually increased. The increase step may be capped such that the filter strength cannot increase more than a predetermined threshold value. An exemplary threshold may be 15% greater than the filter strength for the previous pixel.

Figure 5:
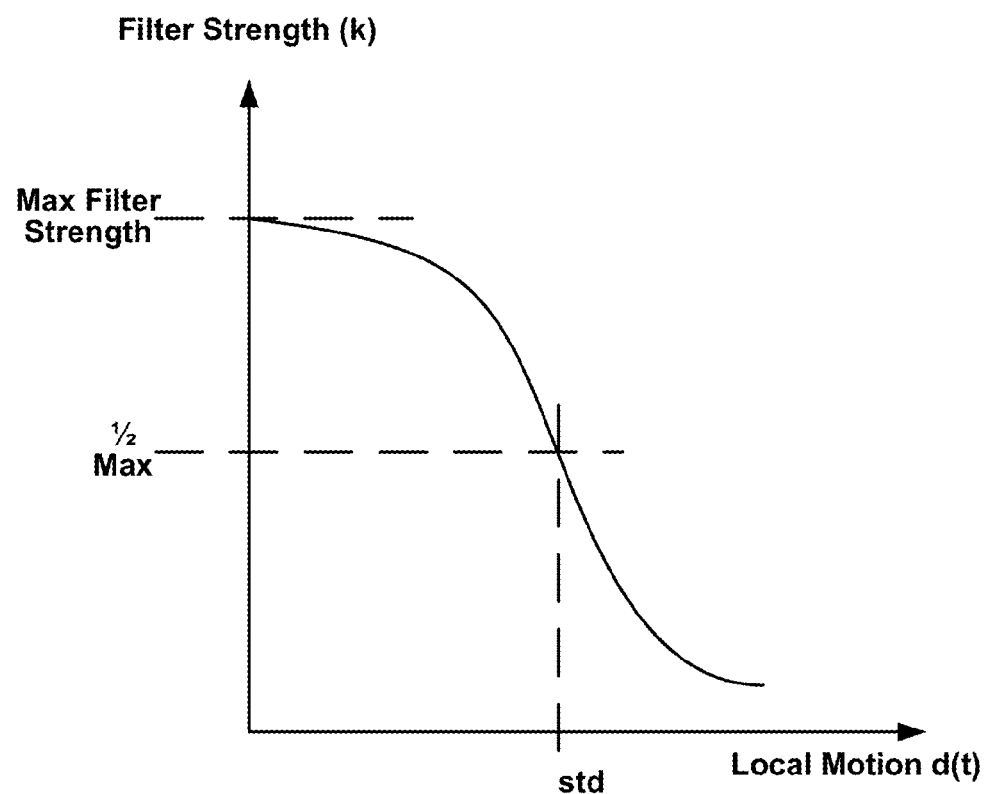
FIG. 5 illustrates a graph representing exemplary calculations of filter strength used to populate the motion table according to an embodiment of the present invention.

FIG. 5 illustrates a graph representing exemplary calculations of filter strength used to populate the motion table according to an embodiment of the present invention. The curve shown in FIG. 5 is a function of Equation 4:

$$k = \frac{\text{max\_filter\_strength}}{1+\left(\frac{d(t)}{\beta*std}\right)^\alpha} \qquad \text{Eq. 4}$$

where d(t) is a delta for the local motion; std is calculated per frame as the estimated standard deviation of the sensor noise as shown in FIG. 5; β is a compensation factor that is light level dependent and is used to trade-off between motion and noise; α is a control value that determines the shape and the fall off the curve, which determines how fast the filter strength attenuates such that a greater slope will cause the filter strength to drop more rapidly.

In populating the motion table, the delta d(t) may be set to a variety of values, each different to accommodate a different local motion value for the pixels of the frame. std may be calculated as a function of a sensor specific noise model that is derived using the read noise, well capacity, and conversion gain for the camera sensor. These sensor settings may be received from the camera or a controller for the camera. Accordingly, std may be adjusted upon detection of a camera sensor setting change. α may be set by default or may be a variable value adjusted to accommodate the resource availability in the system. β may be set to accommodate the light detected during image capture or may be a value calculated based on the luminance value of the frame.

Global motion may be calculated at the TNR as the maximum difference between two consecutive frames. For example, according to an embodiment, the maximum absolute difference of down-sampled scene brightness tiled statistics may be used to estimate global motion. Additionally, according to an embodiment, the global motion may be provided by the ISP, camera, controller, or other element of the system. However, as previously noted, in low lighting conditions, the SNR may be poor and the hardware provided global motion value may therefore be inaccurate. Global motion may determine the threshold that identifies when an increasing step in filter strength should be lowered or raised. For a frame exhibiting higher motion, the maximum increase in filter strength should be lower and for a frame exhibiting low motion, the maximum increase in filter strength should be higher. As motion increases, the filter strength may fall off.

max_filter_strength is a maximum threshold for the filter strength for a frame, defined as a function of the global motion. As a filter strength of 1 would represent complete filtering and a filter strength of 0 would represent no filtering, where global motion is high, or above a predetermined high motion threshold, the filter strength threshold will be lower and where global motion is low, or below a predetermined low motion threshold, the filter strength threshold will be higher. Accordingly, max_filter_strength may typically be set high, but not at the actual maximum of the filter itself. According to an embodiment, the max_filter_strength may be set to 0.9 or 0.95 of the actual maximum filter strength of the filter.

Figure 6:
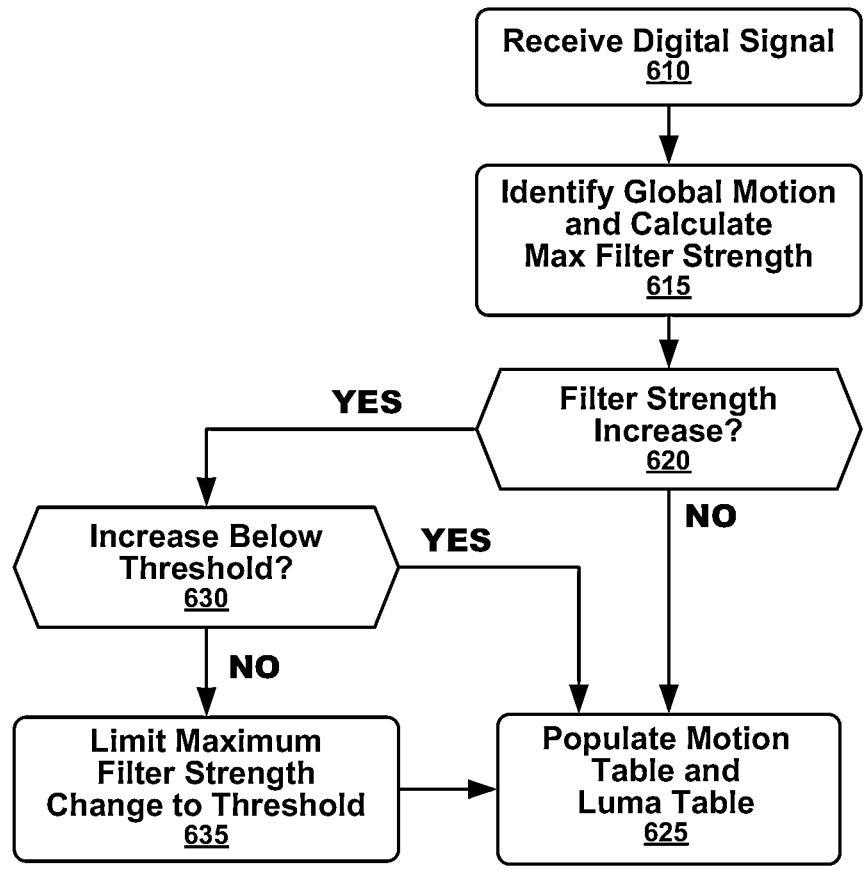
FIG. 6 is a simplified flow diagram illustrating an exemplary method for populating motion and luma lookup tables according to an embodiment of the present invention.

FIG. 6 is a simplified flow diagram illustrating an exemplary method 600 for populating motion and luma lookup tables according to an embodiment of the present invention. As shown in FIG. 6, the digital signal representing a captured image is received by a temporal noise reduction unit (TNR) from a source camera (block 610). The TNR may then calculate or identify global motion for the frame. The global motion may then be used to determine the max filter strength for the frame (block 615). If the maximum filter strength has not increased between consecutive frames (block 620), then the motion table and luma table may be populated using the calculated maximum filter strength in accordance with Equation 4 above (block 625).

However, if the maximum filter strength has increased between consecutive frames (block 620), the increase may be compared to a maximum increase threshold (block 630). If the increase is below the maximum increase threshold (block 630), then the maximum filter strength may be used to populate the lookup tables in accordance with Equation 4 (block 625). If the increase is above the maximum increase threshold (block 630), then the maximum filter strength may be capped and set to the maximum increase threshold (block 635) and the maximum increase threshold may be used to populate the lookup tables (block 625). The motion table may be populated with filter coefficients for multiple motion deltas according to Equation 4 above. The luma table may be populated with luma attenuation factors for adjusting the filter strength depending on various luminance values in the frame.

Figure 7:
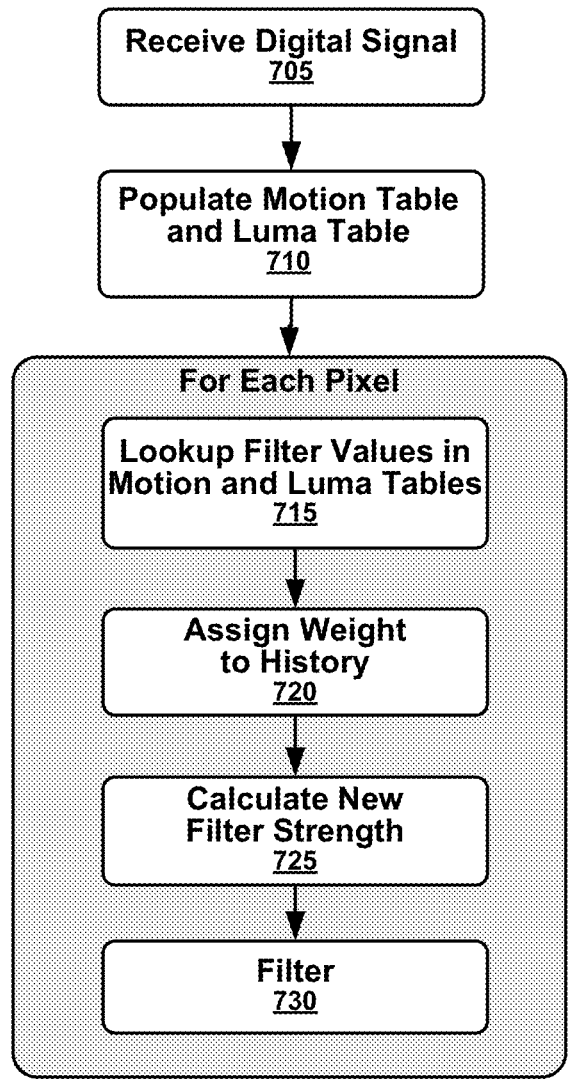
FIG. 7 is a simplified flow diagram illustrating an exemplary method for temporally filtering an image according to an embodiment of the present invention.

FIG. 7 is a simplified flow diagram illustrating an exemplary method 700 for temporally filtering a digital signal representing an image received from a camera according to an embodiment of the present invention. As shown in FIG. 7, the digital signal representing a captured image is received by a temporal noise reduction unit (TNR) from a source camera (block 705) and the motion table and luma table may then be populated according to the method of FIG. 6 (block 710).

Then for each pixel in the frame, the filter coefficients for the current pixel may be determined by using the populated lookup tables (block 715). The lookup value for the motion table may be calculated as a function of the current pixel, the reference pixel and the motion history for the previous pixel. Then the pixel motion history for the next pixel may be calculated (block 720). For pixels exhibiting low motion, the TNR may give greater weight to the difference between consecutive pixels in determining filter strength, whereas for pixels exhibiting higher motion, the TNR may not consider the difference between consecutive pixels. The filter strength based on the filter coefficients retrieved from the motion and luma tables for the current pixel may then be determined (block 725). Then the pixel may be filtered with the determined filter coefficients (block 730).

As discussed above, FIGS. 1, 2, and 4 illustrate functional block diagrams of an exemplary system according to an embodiment of the present invention. In implementation, the system may be embodied as hardware, in which case, the illustrated blocks may correspond to circuit sub-systems within encoder systems. Alternatively, the components of the system may be embodied as software, in which case, the blocks illustrated may correspond to program modules within encoder software programs. In yet another embodiment, the system may be a hybrid system involving both hardware circuit systems and software programs. Moreover, not all of the functional blocks described herein need be provided or need be provided as separate units. For example, although FIG. 1 illustrates the components of an exemplary system, such as the TNR 120, ISP 130, and GPU 140, as separate units, in one or more embodiments, some or all of them may be integrated. Similarly, some components may not be implemented as part of the image processing system, for example, the ISP 130 and/or GPU 140 may not be implemented. Such implementation details are immaterial to the operation of the present invention unless otherwise noted above.

Some embodiments may be implemented, for example, using a non-transitory computer-readable storage medium or article which may store an instruction or a set of instructions that, if executed by a processor, may cause the processor to perform a method in accordance with the disclosed embodiments. The exemplary methods and computer program instructions may be embodied on a non-transitory machine readable storage medium. In addition, a server or database server may include machine readable media configured to store machine executable program instructions. The features of the embodiments of the present invention may be implemented in hardware, software, firmware, or a combination thereof and utilized in systems, subsystems, components or subcomponents thereof. The machine readable storage media may include any medium that can store information. Examples of a machine readable storage medium include electronic circuits, semiconductor memory device, ROM, flash memory, erasable ROM (EROM), floppy diskette, CD-ROM, optical disk, hard disk, fiber optic medium, or any electromagnetic or optical storage device.

While the invention has been described in detail above with reference to some embodiments, variations within the scope and spirit of the invention will be apparent to those of ordinary skill in the art. Thus, the invention should be considered as limited only by the scope of the appended claims.

We claim:

1. A method for processing video data, comprising:
at a temporal noise reduction filter, reducing temporal noise of an input sequence of frames of the video data by:
for each frame,
calculating a global motion as a maximum difference between a current frame and a previous frame;
populating a motion look-up table and a separate luma look-up table using the global motion;
for each pixel of the frame:
calculating a local motion based on the difference between a current pixel and a collocated pixel in a previous frame;
identifying a first filter coefficient from the motion look-up table based on the local motion;
identifying a second filter coefficient from the luma look-up table based on a luma value of the pixel; and
filtering the pixel using both the first and the second filter coefficients.

2. The method of claim 1, further comprising:
for each frame, calculating a maximum filter strength based on the global motion;
if the maximum filter strength for a frame is larger than the maximum filter strength determined for a previous frame in the sequence by more than a predetermined increase amount, setting the new maximum filter strength to the old maximum filter strength plus the predetermined increase amount.

3. The method of claim 2, further comprising:
calculating a weight for the motion history.

4. The method of claim 1, further comprising:
for each frame, receiving a motion history for a previously processed frame.

5. The method of claim 1, wherein said populating the motion table is further based on the following equation:

$$k = \frac{\text{max\_filter\_strength}}{1 + \left(\frac{d(t)}{\beta * std}\right)^{\alpha}}$$

wherein std is the standard deviation of the noise captured by a source of the video data, β is a compensation factor set based on the light level of the frame, α is a control value that determines how fast the filter strength attenuates, d(t) is a potential delta value representing motion between two collocated pixels on adjacent frames, and max_filter_strength is based on the global motion.

6. The method of claim 5, wherein said populating further comprises reducing a threshold for the max_filter_strength if the frame has high global motion.

7. The method of claim 6, wherein the frame has high global motion if the global motion is above a predetermined high motion threshold.

8. The method of claim 5, wherein said populating further comprises increasing a threshold for the max_filter_strength if the frame has low global motion.

9. The method of claim 8, wherein the frame has low global motion if the global motion is below a predetermined low motion threshold.

10. The method of claim 1, wherein said populating the motion table is further based on a sensor specific noise model of a source of the video data.

11. The method of claim 10, wherein said sensor specific noise model is determined using image capture settings of the source.

12. The method of claim 11, wherein said image capture settings are received by the temporal noise reduction filter as part of the video data.

13. The method of claim 11, wherein said image capture settings are received by the temporal noise reduction filter on a channel from the source.

14. The method of claim 11, wherein said image capture settings are received from a controller controlling a plurality of settings for the source.

15. A system comprising:
a temporal noise reduction filter to reduce temporal noise and to receive a sequence of frames wherein:
for each frame, the temporal noise reduction filter:
calculates a global motion as a maximum difference between a current frame and a previous frame, in the sequence of frames and
populates a motion look-up table and a luma look-up table using the global motion;
for each pixel of the frame the temporal noise reduction filter:
calculates a local motion based on a difference between a current pixel and a collocated pixel in a previous frame,
identifies a first filter coefficient from the motion look-up table based on the local motion, and
identifies a second filter coefficient from the luma look-up table based on a luma value of the pixel; and
a filter configured to filter each pixel using both the first and second filter coefficients.

16. The system of claim 15, wherein the temporal noise reduction filter is further configured to calculate a maximum filter strength for each frame, based on the global motion of the frame and if the maximum filter strength is greater than a predetermined threshold, set the maximum filter strength to the predetermined increase threshold.

17. The system of claim 16, wherein the predetermined threshold is calculated as the maximum filter strength of a previous frame in the sequence adjusted by a predetermined value.

18. The system of claim 15, wherein the temporal noise reduction filter further receives a motion history for a previously processed frame.

19. The system of claim 18, wherein the temporal noise reduction filter is further configured to calculate a weight for the motion history.

20. The system of claim 19, wherein said weight is adjusted down if the frame has high global motion.

21. The system of claim 19, wherein said weight is adjusted up if the frame has low global motion.

22. The system of claim 15, wherein said motion table is populated based on a standard deviation for sensor noise calculated using a sensor specific noise model of a source of the sequence of frames.

23. The system of claim 22, wherein said sensor specific noise model is determined using image capture settings of the source.

24. The system of claim 23, wherein said image capture settings are received as part of the video data.

25. The system of claim 23, further comprising a controller wherein the controller controls a plurality of settings for the source and the temporal noise reduction filter receives image capture settings from the controller.

26. A non-transitory computer readable medium storing program instructions that, when executed by a processing device, cause the device to:
upon receipt of an input sequence of frames of video data, for each frame,
calculate a global motion as a maximum difference between a current frame and a previous frame, in the sequence of frames, and
populate a motion look-up table and a luma look-up table using the global motion, and
for each pixel of the frame:
calculate a local motion based on a difference between a current pixel and a collocated pixel in a previous frame,
identify a first filter coefficient from the motion look-up table based on the local motion, and
identify a second filter coefficient from the luma look-up table based on a luma value of the pixel; and
filter the pixel using both the first and second filter coefficients.

27. The non-transitory computer readable medium of claim 26, wherein said device is further configured to calculate a maximum filter strength based on the global motion and if the maximum filter strength is greater than a predetermined threshold, setting the new maximum filter strength to the predetermined threshold.

28. The non-transitory computer readable medium of claim 27, wherein the predetermined threshold is calculated as the maximum filter strength of a previous frame in the sequence adjusted by a predetermined value.

29. The non-transitory computer readable medium of claim 26, wherein said device is further configured to receive a motion history for a previously processed frame.

30. The non-transitory computer readable medium of claim 29, wherein said device is further configured to calculate a weight for the motion history.

31. The non-transitory computer readable medium of claim 30, wherein said weight is lowered if the frame has high global motion.

32. The non-transitory computer readable medium of claim 31, wherein said weight is increased if the frame has low global motion.

33. The non-transitory computer readable medium of claim 26, wherein said motion table is populated based on a sensor specific noise model of a source of the video data.

34. The non-transitory computer readable medium of claim 33, wherein said sensor specific noise model is determined using image capture settings of the source.

* * * * *